United States Patent
Sakai

(10) Patent No.: US 11,686,662 B2
(45) Date of Patent: Jun. 27, 2023

(54) MICROPARTICLE SORTING DEVICE AND METHOD FOR SORTING MICROPARTICLES

(71) Applicant: SONY CORPORATION, Tokyo (JP)

(72) Inventor: Yoshitsugu Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 184 days.

(21) Appl. No.: 17/047,009

(22) PCT Filed: Mar. 12, 2019

(86) PCT No.: PCT/JP2019/009943
§ 371 (c)(1),
(2) Date: Oct. 12, 2020

(87) PCT Pub. No.: WO2019/207988
PCT Pub. Date: Oct. 31, 2019

(65) Prior Publication Data
US 2021/0080372 A1  Mar. 18, 2021

(30) Foreign Application Priority Data
Apr. 25, 2018 (JP) .............................. JP2018-083946

(51) Int. Cl.
*G01N 15/14* (2006.01)

(52) U.S. Cl.
CPC ....... *G01N 15/14* (2013.01); *G01N 2015/149* (2013.01)

(58) Field of Classification Search
CPC ............. G01N 15/14; G01N 2015/149; G01N 2015/1406; G01N 2015/1452; G01N 2015/1481
See application file for complete search history.

(56) References Cited

U.S. PATENT DOCUMENTS

| | | | | |
|---|---|---|---|---|
| 4,318,483 A * | 3/1982 | Lombardo | ......... | G01N 15/1404 209/579 |
| 5,643,796 A * | 7/1997 | Van den Engh | ... | G01N 15/1404 435/286.2 |
| 5,737,078 A | 4/1998 | Takarada et al. | | |
| 8,975,595 B2 * | 3/2015 | Norton | ............... | G01N 15/1427 436/172 |
| 9,921,160 B2 * | 3/2018 | Anazawa | ........... | G01N 21/6454 |
| 10,126,225 B2 * | 11/2018 | Marquette | .......... | G01N 15/1427 |

(Continued)

FOREIGN PATENT DOCUMENTS

| AU | 2017276244 A1 | 1/2018 |
|---|---|---|
| CA | 2155403 A1 | 2/1996 |

(Continued)

OTHER PUBLICATIONS

International Search Report and Written Opinion of PCT Application No. PCT/JP2019/009943, dated Jun. 11, 2019, 09 pages of ISRWO.

*Primary Examiner* — Michael McCullough
*Assistant Examiner* — Jessica L Burkman
(74) *Attorney, Agent, or Firm* — Chip Law Group

(57) ABSTRACT

There is provided technology that enables a microparticle sorting device to be adjusted highly accurately without using adjustment beads. The present technology provides a microparticle sorting device including a light detection unit that optically detects a microparticle flowing through a flow path, a droplet forming unit that forms a droplet containing the microparticle, and a device adjustment unit that adjusts the device, in which, in a process of adjusting the device before actual measurement of the microparticle, the device adjustment unit performs optical axis position calibration for calibrating a relative position of the flow path relative to irradiation light and delay time calibration for calibrating a delay time from light irradiation to the microparticle to (Continued)

formation of the droplet on the basis of information obtained from the microparticle to be measured.

13 Claims, 2 Drawing Sheets

(56) References Cited

U.S. PATENT DOCUMENTS

| | | | |
|---|---|---|---|
| 2005/0078299 A1* | 4/2005 | Fritz | G01N 15/1484 356/39 |
| 2009/0294702 A1 | 12/2009 | Imanishi et al. | |
| 2011/0267604 A1* | 11/2011 | Swalwell | G01N 15/1434 356/152.1 |
| 2013/0337575 A1* | 12/2013 | Fox | G01N 15/1427 436/172 |
| 2014/0306122 A1 | 10/2014 | Norton et al. | |
| 2015/0057787 A1 | 2/2015 | Muraki et al. | |
| 2018/0313740 A1 | 11/2018 | Otsuka | |

FOREIGN PATENT DOCUMENTS

| | | |
|---|---|---|
| CN | 1116708 | 2/1996 |
| CN | 104204766 A | 12/2014 |
| CN | 105143851 A | 12/2015 |
| CN | 108139312 A | 6/2018 |
| EP | 0696731 A2 | 2/1996 |
| EP | 2984468 A1 | 2/2016 |
| EP | 3343200 A1 | 7/2018 |
| JP | 08-050089 A | 2/1996 |
| JP | 08-304263 A | 11/1996 |
| JP | 11-083724 A | 3/1999 |
| JP | 2010-008397 A | 1/2010 |
| JP | 2013-210287 A | 10/2013 |
| JP | 2016-521362 A | 7/2016 |
| JP | 2016-145834 A | 8/2016 |
| JP | 2018-059943 A | 4/2018 |
| TW | 294782 B | 1/1997 |
| WO | 2014/169231 A1 | 10/2014 |
| WO | 2017/068822 A1 | 4/2017 |

* cited by examiner

MICROPARTICLE SORTING DEVICE AND METHOD FOR SORTING MICROPARTICLES

CROSS REFERENCE TO RELATED APPLICATIONS

This application is a U.S. National Phase of International Patent Application No. PCT/JP2019/009943 filed on Mar. 12, 2019, which claims priority benefit of Japanese Patent Application No. JP 2018-083946 filed in the Japan Patent Office on Apr. 25, 2018. Each of the above-referenced applications is hereby incorporated herein by reference in its entirety.

TECHNICAL FIELD

The present technology relates to a device that sorts microparticles flowing through a flow path. More specifically, the present technology relates to a device that detects optical information from microparticles flowing through a flow path and sorts the microparticles on the basis of a result of the detection, and a method for sorting microparticles.

BACKGROUND ART

In recent years, with the development of analytical methods, there has been developed a technique of causing biological microparticles such as cells and microorganisms, microparticles such as microbeads, and the like to flow through a flow path to measure the microparticles individually in a process of causing them to flow, or to analyze and sort the measured microparticles.

As a typical example of such a method of analyzing or sorting microparticles, technical improvement of an analytical method called flow cytometry has been rapidly evolving. The flow cytometry is an analytical method of analyzing and sorting microparticles by pouring the aligned microparticles to be analyzed into fluid, irradiating the microparticles with laser light or the like, and detecting fluorescence or scattered light emitted from each microparticle.

In the analysis of the microparticles as typified by the flow cytometry and the like, optical methods in which the microparticles to be analyzed are irradiated with light such as a laser and fluorescence or scattered light emitted from the microparticles is detected have been widely used. Then, a histogram is extracted by an analysis computer and software on the basis of the detected optical information, thereby performing the analysis.

In the optical analysis of the microparticles, the device is adjusted as quality control (QC) before the optical measurement of the microparticles to be actually tested. For the adjustment of the device, one type of beads (alignment check beads, Ultra Rainbow fluorescent particles, etc.) labeled with a fluorescent dye having a single fluorescence intensity capable of obtaining a wide range spectrum or the like has been generally used.

For example, Patent Document 1 discloses a technique of calibrating/standardizing a flow cytometry device by including, using synthetic polymer particles or beads having a predetermined volume and refractive index value, a) a process of calibration or causing standard synthetic particles to pass through an incident flux of light for particles to be assayed, b) a process of detecting first and second measurable signals from the calibration or the standard synthetic particles passing through the incident flux of light, c) a process of measuring the intensities of the first and second signals to generate a pair of the signal intensities, d) a process of converting the pair of the signal intensities into a volume and refractive index value and applying a standardized signal gain to a flow cytometer, and e) a process of (i) measuring the volume and the refractive index and (ii) calibrating the flow cytometer for count of analyzable particles having signals within a range of an appropriate volume and refractive index.

Furthermore, for example, Patent Document 2 discloses a calibration method in a microparticle sorting device including a liquid feeding procedure of causing fluid containing two or more types of calibration particles having different sizes and fluorescence intensities to flow through a flow path formed in a microchip or a flow cell, a first signal acquisition procedure of detecting light generated from, on the basis of laser irradiation, the microchip or the flow cell from a plurality of positions on the microchip or the flow cell, and a procedure of identifying the position at which the area average value of the integrated value of the detected light intensities generated from all types of the calibration particles becomes larger.

CITATION LIST

Patent Document

Patent Document 1: Japanese Patent Application Laid-Open No. H11-83724
Patent Document 2: Japanese Patent Application Laid-Open No. 2013-210287

SUMMARY OF THE INVENTION

Problems to be Solved by the Invention

As described above, while the adjustment beads have been used to adjust the device in the quality control of the microparticle sorting device, the microparticles to be actually tested may be, for example, cells to be used for cellular therapy and the like and mixing of foreign matter may be strictly prohibited in some cases.

Meanwhile, although there are also sorting devices capable of performing device adjustment without using the adjustment beads, such devices require fully manual adjustment, thereby causing a problem that the accuracy varies depending on the experience of a user.

In view of the above, it is a main object of the present technology to provide a technique for enabling highly accurate adjustment in adjustment of a microparticle sorting device without using adjustment beads.

Solutions to Problems

That is, first, the present technology provides a microparticle sorting device including:
a light detection unit that optically detects a microparticle flowing through a flow path;
a droplet forming unit that forms a droplet containing the microparticle; and
a device adjustment unit that adjusts the device, in which
in a process of adjusting the device before actual measurement of the microparticle,
on the basis of information obtained from the microparticle to be measured,
the device adjustment unit performs:
optical axis position calibration for calibrating a relative position of the flow path relative to irradiation light; and delay time calibration for calibrating a delay time from light irradiation to the microparticle to formation of the droplet.

The microparticle sorting device according to the present technology may include an optical axis position display function that displays the relative position of the flow path relative to the irradiation light.

The microparticle sorting device according to the present technology may include a droplet detection unit that detects a state of the droplet.

In the microparticle sorting device according to the present technology, the device adjustment unit may perform droplet formation calibration for calibrating droplet formation in the droplet forming unit on the basis of the state of the droplet detected by the droplet detection unit.

In this case, a frequency of a drive voltage supplied to a vibrating element may be calibrated in the droplet formation calibration.

The state of the droplet to be detected by the droplet detection unit of the microparticle sorting device according to the present technology may be one or more states selected from a form of the droplet, a position of the droplet, a traveling direction of the droplet, and a width of a droplet stream.

The microparticle sorting device according to the present technology may include a droplet information display function that displays information associated with the droplet detected by the droplet detection unit.

The microparticle sorting device according to the present technology may include a droplet direction control unit that controls the traveling direction of the droplet.

The microparticle sorting device according to the present technology may include a droplet direction control unit that controls the traveling direction of the droplet, in which the device adjustment unit performs droplet stream calibration for calibrating control of the traveling direction of the droplet in the droplet direction control unit on the basis of the traveling direction of the droplet detected by the droplet detection unit.

In this case, the droplet direction control unit may include a charging unit that imparts a charge to the droplet and a deflection plate that changes the traveling direction of the droplet, and a charge voltage in the charging unit may be calibrated in the droplet stream calibration.

The microparticle sorting device according to the present technology may include a storage that stores the device adjustment result in the device adjustment unit.

The microparticle sorting device according to the present technology may include an automatic or manual switching function for the device adjustment in the device adjustment unit.

The microparticle sorting device according to the present technology may use bioparticles as the microparticles.

Next, the present technology provides a method for sorting microparticles including:

a process of causing microparticles to flow through a flow path;

a process of optically detecting the microparticles flowing through the flow path;

a process of forming a droplet containing the microparticles;

a process of sorting the microparticles; and a process of adjusting a device, in which in adjusting the device before sorting the microparticles, on the basis of information obtained from the microparticles to be sorted, the process of adjusting the device includes:

optical axis position calibration for calibrating a relative position of the flow path relative to irradiation light; and delay time calibration for calibrating a delay time from light detection from the microparticles to formation of the droplet.

In the present technology, "microparticles" are intended to broadly include biologically relevant microparticles such as cells, microorganisms, and liposomes, synthetic particles such as latex particles, gel particles, and industrial particles, or the like.

The biologically relevant microparticles include chromosomes, liposomes, mitochondria, organelles (cell organelles), and the like constituting various cells. The cells include animal cells (blood cells, etc.) and plant cells. The microorganisms include bacteria such as *Escherichia coli*, viruses such as tobacco mosaic virus, fungi such as yeast, and the like. Moreover, the biologically relevant microparticles are also assumed to include biologically relevant macromolecules such as nucleic acids, proteins, and complexes thereof.

Furthermore, the industrial particles may be, for example, an organic or inorganic polymer material, a metal, or the like. The organic polymer material includes polystyrene, styrene-divinylbenzene, polymethylmethacrylate, and the like. The inorganic polymer material includes glass, silica, a magnetic material, and the like. The metal includes gold colloid, aluminum, and the like. Although the shape of those microparticles is generally spherical, it may be non-spherical, and the size, mass, and the like are also not particularly limited.

Effects of the Invention

According to the present technology, in the adjustment of the microparticle sorting device, it becomes possible to perform highly accurate adjustment without using the adjustment beads.

Note that the effects described herein are not necessarily limited, and may be any of the effects described in the present technology.

MODE FOR CARRYING OUT THE INVENTION

Figure 1:
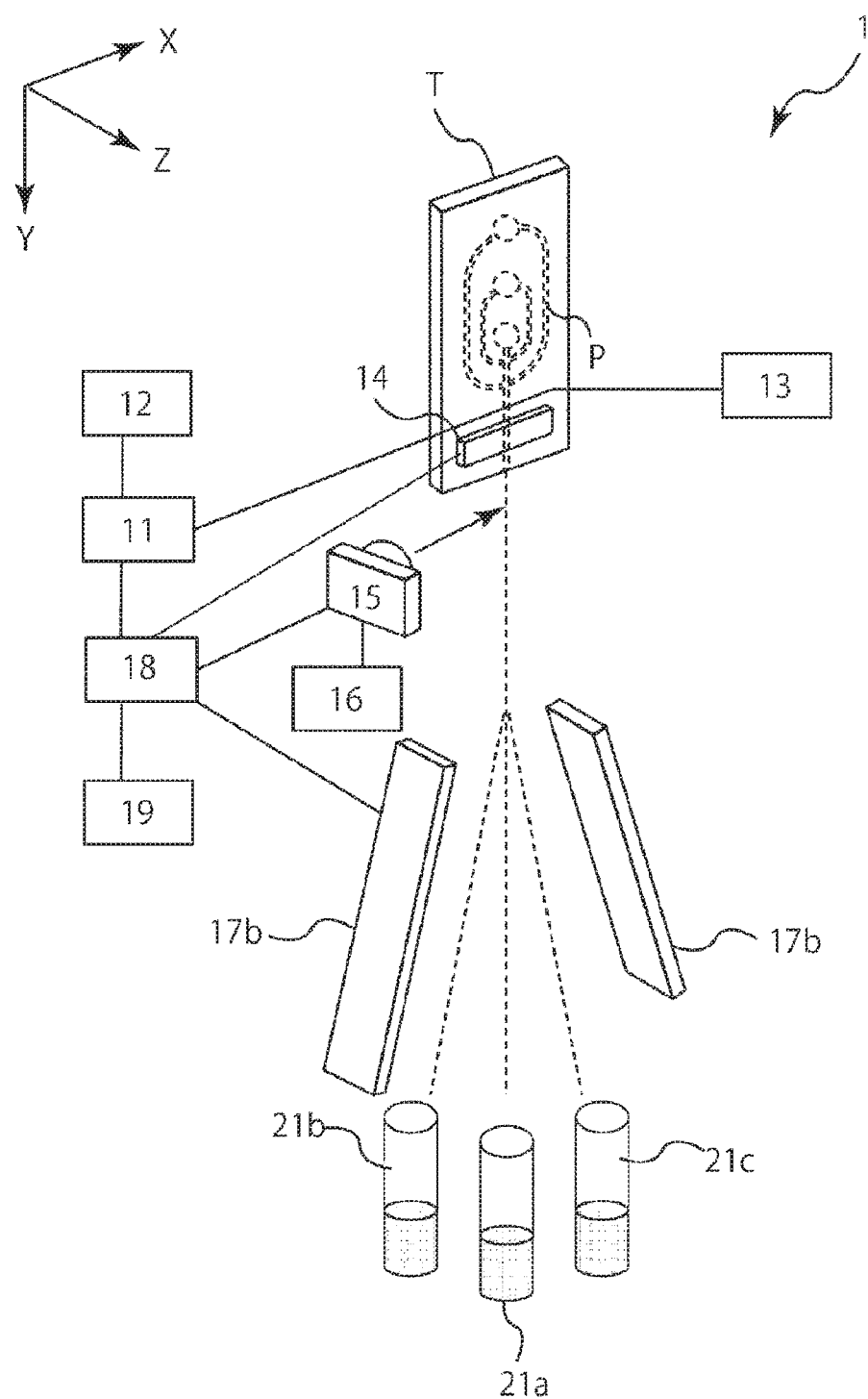
FIG. 1 is a schematic conceptual diagram schematically illustrating an exemplary flow cytometer that can use a microparticle sorting device 1 according to the present technology.

Hereinafter, preferred embodiments for implementing the present technology will be described with reference to the accompanying drawings. The embodiments to be described below are exemplary typical embodiments of the present technology, and the scope of the present technology is not construed to be narrowed by the embodiments. Note that descriptions will be given in the following order.

1. Microparticle Sorting Device 1
(1) Flow Path P
(2) Light Irradiation Unit 11
(3) Optical Axis Position Display Function 12
(4) Light Detection Unit 13

(5) Droplet Forming Unit 14
(6) Droplet Detection Unit 15
(7) Droplet Information Display Function 16
(8) Droplet Direction Control Unit 17
(9) Device Adjustment Unit 18
(10) Storage 19
(11) Automatic or Manual Switching Function 20
(12) Sorting Unit 21
2. Method for Sorting Microparticles
1. Microparticle Sorting Device 1

A microparticle sorting device 1 according to the present technology is a device that can be used at the time of sorting microparticles, and includes at least a light detection unit 13, a droplet forming unit 14, and a device adjustment unit 18. Furthermore, a flow path P, a light irradiation unit 11, an optical axis position display function 12, a droplet detection unit 15, a droplet information display function 16, a droplet direction control unit 17, a storage 19, an automatic or manual switching function 20, a sorting unit 21, and the like can be further provided as necessary.

Examples of a device for sorting microparticles that can use the microparticle sorting device 1 according to the present technology include a flow cytometer. FIG. 1 is a schematic conceptual diagram schematically illustrating an exemplary flow cytometer that can use the microparticle sorting device 1 according to the present technology. Hereinafter, details of each unit will be described in time series of sorting.

(1) Flow Path P

The flow cytometer that can use the microparticle sorting device 1 according to the present technology is capable of analyzing and sorting microparticles by detecting optical information obtained from the microparticles aligned in a row in a flow cell (flow path P).

While the flow path P may be provided in the flow cytometer in advance, it is also possible to install, for example, a commercially available flow path P or a disposable chip provided with the flow path P in the flow cytometer to perform analysis or sorting.

Figure 2:
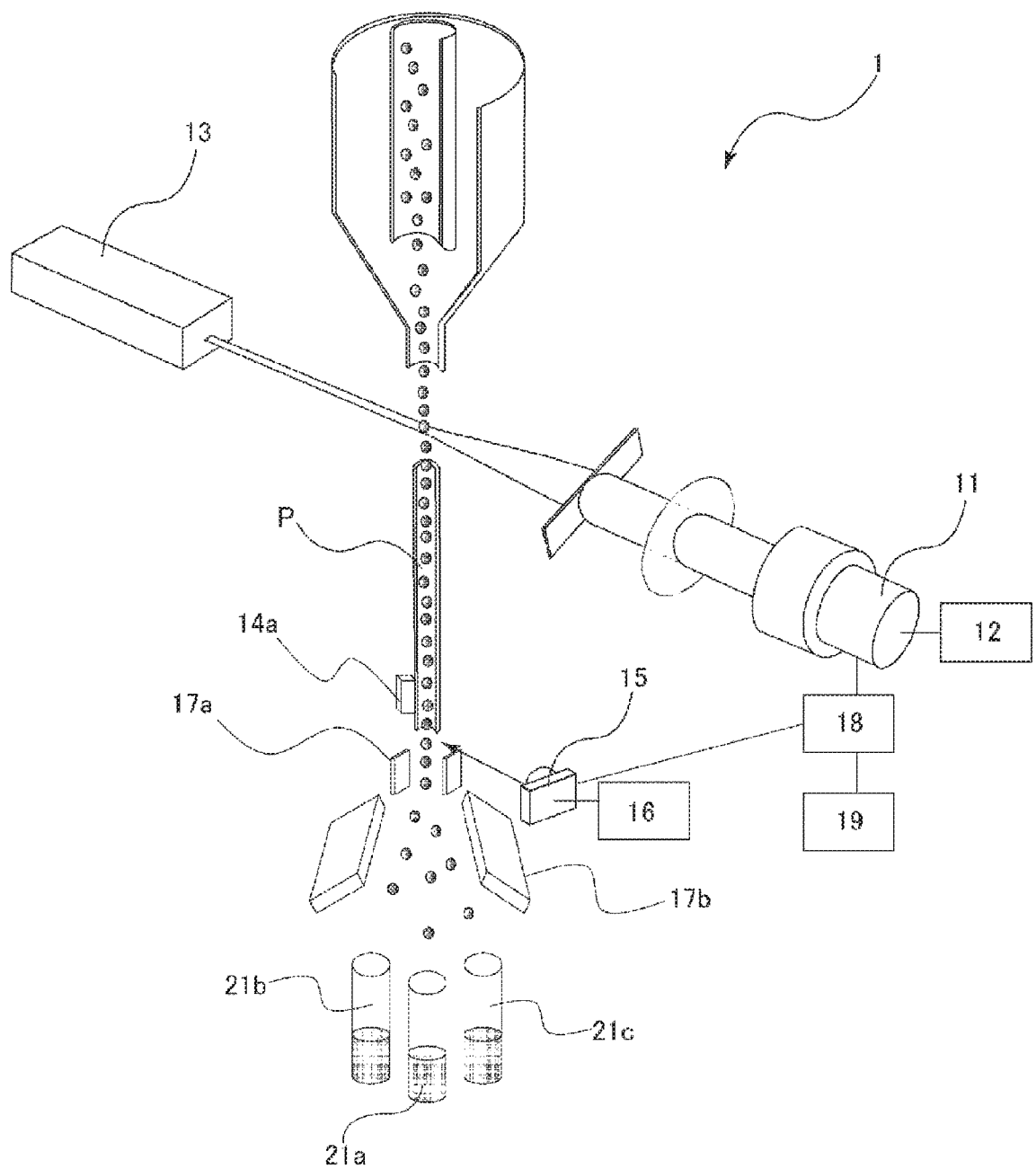
FIG. 2 is a schematic conceptual diagram schematically illustrating an exemplary flow cytometer different from FIG. 1 that can use the microparticle sorting device 1 according to the present technology.

The form of the flow path P is not particularly limited, and can be freely designed. For example, it is not limited to the flow path P formed in a substrate T such as a two-dimensional or three-dimensional plastic, glass, or the like as illustrated in FIG. 1, and the flow path P used in a conventional flow cytometer can be used in the flow cytometer as illustrated in FIG. 2 to be described later.

Furthermore, a flow path width, a flow path depth, and a flow path cross-sectional shape of the flow path P are not particularly limited as long as a laminar flow can be formed, and can be freely designed. For example, a micro flow path having a flow path width of 1 mm or less can be used for the flow cytometer. In particular, a micro flow path having a flow path width of about 10 μm or more and 1 mm or less can be more preferably used for the flow cytometer that can use the microparticle sorting device 1 according to the present technology.

The microparticles caused to flow in the flow path P can be labeled with one or more dyes such as fluorescent dyes. In this case, examples of the fluorescent dye that can be used in the present technology include Cascade Blue, Pacific Blue, Fluorescein isothiocyanate (FITC), Phycoerythrin (PE), Propidium Iodide (PI), Texas Red (TR), Peridinin chlorophyll protein (PerCP), Allophycocyanin (APC), 4',6-Diamidino-2-phenylindole (DAPI), Cy3, Cy5, Cy7, Brilliant Violet (BV421), and the like.

(2) Light Irradiation Unit 11

The microparticle sorting device 1 according to the present technology may include the light irradiation unit 11. The light irradiation unit 11 irradiates the microparticles flowing through the flow path P with light. The light irradiation unit 11 is not essential to the microparticle sorting device 1 according to the present technology, and an external light irradiation device or the like may be used to irradiate the microparticles flowing through the flow path P with light.

Although a type of the light emitted from the light irradiation unit 11 is not particularly limited, light having a constant light direction, wavelength, and light intensity is desirable in order to reliably generate fluorescence or scattered light from the microparticles. Examples thereof include a laser and a light-emitting diode (LED). In the case of using a laser, a type thereof is also not particularly limited, and one or more types of an argon ion (Ar) laser, a helium-neon (He—Ne) laser, a dye laser, a krypton (Cr) laser, a semiconductor laser, a solid-state laser in which a semiconductor laser and a wavelength conversion optical element are combined, or the like can be freely combined and used.

(3) Optical Axis Position Display Function 12

The microparticle sorting device 1 according to the present technology may include the optical axis position display function 12. The optical axis position display function 12 is a function of displaying a relative position of the flow path P relative to the irradiation light. The optical axis position display function 12 is not essential to the microparticle sorting device 1 according to the present technology, and an external display device or the like may be used to display the relative position of the flow path P relative to the irradiation light.

A display method is not particularly limited as long as the relative position of the flow path P relative to the irradiation light can be recognized by the display based on the optical axis position display function 12. For example, the position of the flow path P or the position of the chip including the flow path P may be displayed to present, to a user, the relative position of the flow path P relative to the irradiation light, or the course of the irradiation light may be displayed to present, to the user, the relative position of the flow path P relative to the irradiation light.

With the optical axis position display function 12 being included in the microparticle sorting device 1 according to the present technology, calibration of the optical axis position in the device adjustment unit 18 to be described later can be performed smoothly and easily. Furthermore, the user can easily recognize a calibration state of the optical axis position in the device adjustment unit 18 to be described later.

(4) Light Detection Unit 13

The light detection unit 13 optically detects the microparticles flowing through the flow path P. The light detection unit 13 that can be used in the present technology is not particularly limited in its specific method of light detection as long as light signals from the microparticles can be detected, and a method of light detection used in a publicly known light detector can be freely selected and adopted. For example, one or more types of light detection methods used in a fluorescence measuring instrument, a scattered light measuring instrument, a transmitted light measuring instrument, a reflected light measuring instrument, a diffracted light measuring instrument, an ultraviolet spectroscopic measuring instrument, an infrared spectroscopic measuring instrument, a Raman spectroscopic measuring instrument, a fluorescence resonance energy transfer (FRET) measuring instrument, a fluorescent in situ hybridization (FISH) measuring instrument, other various spectrum measuring instruments, a photodiode array or a photomultiplier tube (PMT) array in which light receiving elements such as PMTs and photodiodes are one-dimensionally arrayed, those in which multiple independent detection channels such as two-dimensional light receiving elements such as a charge-coupled device (CCD) or a complementary metal-oxide semiconductor (CMOS) are arranged, or the like can be freely combined and adopted.

Furthermore, the installation location of the light detection unit 13 in the microparticle sorting device 1 according to the present technology is not particularly limited as long as light signals can be detected from the microparticles, and can be freely designed. For example, it is preferably disposed on the opposite side of the light irradiation unit 11 with the flow path P interposed therebetween, as illustrated in FIGS. 1 and 2. This is because, with the light detection unit 13 being disposed on the opposite side of the light irradiation unit 11 with the flow path P interposed therebetween, the light irradiation unit 11 and the light detection unit 13 can be disposed in a freer configuration. Furthermore, since the fluorescence is emitted also in a direction different from the incident direction of the irradiation light, for example, the light detection unit 13 may be disposed on the side same as the light irradiation unit 11 or on the side of the 90-degree side face with respect to the flow path P.

(5) Droplet Forming Unit 14

The droplet forming unit 14 forms droplets containing microparticles. Specifically, for example, the whole or a part of the flow path P is vibrated using a vibrating element 14a that vibrates at a predetermined vibration frequency or the like, thereby generating droplets from the discharge outlet of the flow path P. Note that, in this case, the vibrating element 14a to be used is not particularly limited, and a publicly known element can be freely selected and used. Examples thereof include a piezoelectric vibrating element. Furthermore, by adjusting the amount of liquid fed to the flow path P, the diameter of the discharge outlet, the vibration frequency of the vibrating element, and the like, it becomes possible to adjust the size of the droplet and to generate droplets each containing a certain amount of sample.

(6) Droplet Detection Unit 15

The microparticle sorting device 1 according to the present technology may include the droplet detection unit 15. The droplet detection unit 15 detects a state of the droplet formed by the droplet forming unit 14. More specifically, the droplet detection unit 15 can detect a state of the droplet such as a form of the droplet, a position of the droplet, a traveling direction of the droplet, and a width of the droplet stream.

A specific detection method in the droplet detection unit 15 is not particularly limited as long as a state of the droplet can be detected, and a detection method used in a publicly known detector can be freely selected and adopted. For example, a state of the droplet can be detected by imaging using a CCD camera, a CMOS sensor, or the like.

Note that the droplet detection unit 15 is not essential to the microparticle sorting device 1 according to the present technology, and an external imaging device or the like may be used to detect a state of the droplet.

(7) Droplet Information Display Function 16

The microparticle sorting device 1 according to the present technology may include the droplet information display function 16. The droplet information display function 16 is a function of displaying information associated with the droplet detected by the droplet detection unit 15. The droplet information display function 16 is not essential to the microparticle sorting device 1 according to the present technology, and an external display device or the like may be used to display the information associated with the droplet.

A display method is not particularly limited as long as the information associated with the droplet can be recognized by the display based on the droplet information display function 16. For example, according to the droplet information display function 16, a state of the droplet such as a form of the droplet, a position of the droplet, a traveling direction of the droplet, and a width of the droplet stream can be displayed.

With the droplet information display function 16 being included in the microparticle sorting device 1 according to the present technology, calibration of droplet formation in the device adjustment unit 18 to be described later and control of the droplet traveling direction in the droplet direction control unit 17 to be described later can be performed smoothly and easily. Furthermore, the user can easily recognize a calibration state of the droplet formation in the device adjustment unit 18 to be described later and a control state of the droplet traveling direction in the droplet direction control unit 17 to be described later.

(8) Droplet Direction Control Unit 17

The microparticle sorting device 1 according to the present technology may include the droplet direction control unit 17. The droplet direction control unit 17 controls the traveling direction of the droplet formed by the droplet forming unit 14.

A specific control method in the droplet direction control unit 17 is not particularly limited as long as the traveling direction of the droplet can be controlled, and for example, the traveling direction of the droplet can be controlled with a charging unit 17a that imparts a charge to the droplet and a deflection plate 17b (which may be a counter electrode etc.) that changes the traveling direction of the droplet being included.

(9) Device Adjustment Unit 18

The device adjustment unit 18 performs at least (9-1) optical axis position calibration and (9-2) delay time calibration in a device adjustment process before actual measurement of the microparticles. Furthermore, (9-3) droplet formation calibration, (9-4) droplet stream calibration, and the like can also be performed.

In the device adjustment unit 18 of the microparticle sorting device 1 according to the present technology, each calibration is carried out on the basis of the information obtained from the microparticles to be measured in the device adjustment process before actual measurement of the microparticles.

A conventional microparticle sorting device generally uses adjustment beads. Since the adjustment beads have extremely high uniformity in size, light intensity, and the like, there is an advantage that highly accurate calibration can be performed. However, in a case where the microparticles to be actually tested are cells to be used for cellular therapy and the like and mixing of foreign matter is strictly prohibited, after calibration beads are caused to flow through the flow path and the device is adjusted, it has been necessary to clean the flow path, replace the flow path, replace each chip including the flow path, or the like. In this case, there has been a case where the sorted cells and the like cannot be used for cellular therapy and the like if the cleaning is inadequate, or the adjusted optical axis and the like is misaligned if the flow path or the chip including the flow path is replaced.

Meanwhile, in the device adjustment unit 18 of the microparticle sorting device 1 according to the present technology, each calibration described above is carried out on the basis of the information obtained from the microparticles to be measured, whereby it is not necessary to clean the flow path P, replace the flow path P or a chip T including the flow path P, and the like after the device adjustment. As a result, mixing of foreign matter can be suppressed, and highly accurate sorting can be performed.

Note that the present technology does not exclude performing device adjustment using adjustment beads, and the device adjustment using the adjustment beads can be concurrently carried out in the microparticle sorting device 1 according to the present technology. For example, the device adjustment using the adjustment beads is first carried out, the flow path P, the chip T including the flow path P, or the like is then replaced, and then each calibration described above is carried out on the basis of the information obtained from the microparticles to be measured, and a result of the device adjustment using the adjustment beads or the like is referred to in each calibration, whereby more accurate calibration can be carried out.

Hereinafter, each calibration method will be described in detail.

(9-1) Optical Axis Position Calibration

In the optical axis position calibration, the relative position of the flow path P relative to the irradiation light is calibrated on the basis of the information obtained from the microparticles to be measured.

A method of the optical axis position calibration is not particularly limited as long as the relative position of the flow path P relative to the irradiation light can be calibrated. For example, a position of the flow path P or a position of the chip including the flow path P may be adjusted on the basis of the optical information obtained from the microparticles to be measured by the detection unit 13 to calibrate the relative position of the flow path P relative to the irradiation light, or a position, light irradiation angle, or the like of the light irradiation unit 11 may be adjusted to calibrate the relative position of the flow path P relative to the irradiation light.

A specific example will be described using a schematic conceptual diagram schematically illustrating an exemplary flow cytometer that can use the microparticle sorting device 1 according to the present technology of FIG. 1. For example, the chip T including the flow path P is moved to the position at which light signals emitted from the microparticles to be measured can be obtained by the detection unit 13 in the X-axis direction or the Z-axis direction in the drawing, whereby the optical axis can be calibrated.

Furthermore, for example, the device is adjusted in advance using the adjustment beads, and in the adjusted device, the microparticles to be measured are caused to flow through the flow path to find a detectable setting and the optical axis is calibrated using the setting as a template, whereby more accurate calibration can be performed.

As a more specific example, for example, the device is adjusted using the adjustment beads, and the setting of the adjusted device and optical information such as a fluorescence drawing are saved as a template. Thereafter, the saved template is read when the microparticles to be measured are caused to flow through the flow path, and the optical axis can be calibrated while the optical information such as fluorescence signals obtained in the state of the device setting saved in the template is compared with the optical information such as fluorescence signals saved in the template. At this time, the optical axis may be automatically adjusted by comparing the optical information such as the obtained fluorescence signals with the optical information such as the fluorescence signals saved in the template.

Examples of parameters to be included in the template in this case include one or more parameters selected from device setting conditions (e.g., gain setting, etc.), optical information such as adjusted fluorescence signals (2 plot, histogram, etc.), and the like.

Moreover, for example, the optical axis is calibrated by referring to the past calibration results stored in the storage 19 to be described later, whereby the optical axis can be calibrated easily.

In addition, the calibration of the optical axis with reference to the past calibration results stored in the storage 19 to be described later may be compared with the calibration of the optical axis using the template to automatically calculate the range of the optical axis position.

(9-2) Delay Time Calibration

In the delay time calibration, the delay time from the light irradiation to the microparticles to the formation of the droplets is calibrated on the basis of the information obtained from the microparticles to be measured.

A method of the delay time calibration is not particularly limited as long as the delay time from the light irradiation to the microparticles to the formation of the droplets can be calibrated. As a specific example, a slide glass or the like is disposed on a recovery container 21a of the sorting unit 21 to be described later, and then the microparticles to be measured are sorted. This operation is first carried out multiple times (e.g., 5 times) by changing the sort delay, and the number actually sorted is confirmed with a microscope or the like with respect to the desired number of sorting of the target microparticles, thereby determining the optimal sort delay. Next, at the determined sort delay, the operation is carried out multiple times (e.g., 5 times) by changing the sort phase, and the number actually sorted is confirmed with a microscope or the like with respect to the desired number of sorting of the target microparticles to determine the optimal sort delay, thereby setting the delay time condition.

At this time, the optimal delay time condition may be proposed on the basis of the change in the number of sorting according to the change in the delay time condition.

(9-3) Droplet Formation Calibration

In the droplet formation calibration, the droplet formation in the droplet forming unit 14 is calibrated on the basis of the droplet state detected by the droplet detection unit 15. While the droplet formation calibration can be carried out while the microparticles are caused to flow, it can also be carried out while only sheath fluid is caused to flow.

A method of the droplet formation calibration is not particularly limited as long as the droplet formation in the droplet forming unit 14 can be calibrated. As a specific example, a frequency of the drive voltage supplied to the vibrating element 14a of the droplet forming unit 14 is calibrated on the basis of the generation position of the droplet and the form (presence or absence of satellite, droplet shape, etc.) of the droplet detected by the droplet detection unit 15, whereby the droplet formation can be calibrated.

(9-4) Droplet Stream Calibration

In the droplet stream calibration, control of the droplet traveling direction in the droplet direction control unit 17 is calibrated on the basis of the droplet traveling direction detected by the droplet detection unit 15. While the droplet stream calibration can be carried out while the microparticles are caused to flow, it can also be carried out while only sheath fluid is caused to flow.

A method of the droplet stream calibration is not particularly limited as long as the control of the droplet traveling direction in the droplet direction control unit 17 can be calibrated. As a specific example, the charge voltage in the charging unit 17a of the droplet direction control unit 17 is calibrated on the basis of the droplet traveling direction detected by the droplet detection unit 15, whereby the control of the droplet traveling direction can be calibrated.

(10) Storage 19

The microparticle sorting device 1 according to the present technology may include the storage 19 that stores the device adjustment result in the device adjustment unit 18. The storage 19 can also store, in addition to the device adjustment result in the device adjustment unit 18, the optical information of the microparticles detected by the light detection unit 13, the droplet state detected by the droplet detection unit 15, and the like.

Note that the storage 19 is not essential to the microparticle sorting device 1 according to the present technology, and an external storage device or the like may be used to store the device adjustment result in the device adjustment unit 18 and the like.

(11) Automatic or Manual Switching Function 20

The microparticle sorting device 1 according to the present technology may include the automatic or manual switching function 20 for the device adjustment in the device adjustment unit 18.

While some of the conventional microparticle sorting devices have a function of adjusting the device fully automatically, it has been necessary to use adjustment beads in a case where the device adjustment is carried out fully automatically. Meanwhile, the microparticle sorting device 1 according to the present technology is capable of automatically adjusting the device even though the microparticles to be measured are used. Besides, the automatic or manual switching function 20 is included for the device adjustment in the device adjustment unit 18, whereby fine adjustment to be performed manually and automatic adjustment not affected by the empirical value of the user can be switched depending on the purpose of the sorting and the type of the microparticles to be measured. As a result, it becomes possible to adjust the device more accurately.

(12) Sorting Unit 21

The sorting unit 21 sorts the particles on the basis of the fluorescence signals detected by the light detection unit 13. For example, the sorting unit 14 is capable of sorting the particles downstream of the flow path P on the basis of the analysis result analyzed from the optical information, such as the size, form, and internal structure of the particles.

More specifically, the charging unit 17a of the droplet direction control unit 17 imparts positive or negative charges to the droplets formed by the droplet forming unit 14, the polarization plate 17b of the droplet direction control unit 17 changes the course of the charged droplets to a desired direction, and the droplets are sorted in the target recovery containers 21a to 21c and the like.

2. Method for Sorting Microparticles

A method for sorting microparticles according to the present technology is a method for performing at least a flow process, a light detection process, a droplet forming process, a sorting process, and a device adjustment process. Furthermore, in addition to those processes, a light irradiation process, an optical axis position display process, a droplet detection process, a droplet information display process, a droplet direction control process, a storage process, an automatic or manual switching process, and the like may be performed as necessary.

Note that the details of the respective processes are the same as the processes performed by the respective units of the microparticle sorting device 1 according to the present technology, and the descriptions thereof are omitted here.

Note that the present technology may also have the following configurations.

(1)

A microparticle sorting device including:

a light detection unit that optically detects a microparticle flowing through a flow path;

a droplet forming unit that forms a droplet containing the microparticle; and a device adjustment unit that adjusts the device, in which in a process of adjusting the device before actual measurement of the microparticle, on the basis of information obtained from the microparticle to be measured, the device adjustment unit performs:

optical axis position calibration for calibrating a relative position of the flow path relative to irradiation light; and delay time calibration for calibrating a delay time from light irradiation to the microparticle to formation of the droplet.

(2)

The microparticle sorting device according to (1), further including an optical axis position display function that displays the relative position of the flow path relative to the irradiation light.

(3)

The microparticle sorting device according to (1) or (2), further including a droplet detection unit that detects a state of the droplet.

(4)

The microparticle sorting device according to (3), in which the device adjustment unit performs droplet formation calibration for calibrating droplet formation in the droplet forming unit on the basis of the state of the droplet detected by the droplet detection unit.

(5)

The microparticle sorting device according to (4), in which a frequency of a drive voltage supplied to a vibrating element is calibrated in the droplet formation calibration.

(6)

The microparticle sorting device according to any one of (3) to (5), in which the state of the droplet includes one or more states selected from a form of the droplet, a position of the droplet, a traveling direction of the droplet, and a width of a droplet stream.

(7)

The microparticle sorting device according to any one of (3) to (6), further including a droplet information display function that displays information associated with the droplet detected by the droplet detection unit.

(8)

The microparticle sorting device according to any one of (1) to (7), further including a droplet direction control unit that controls a traveling direction of the droplet.

(9)

The microparticle sorting device according to any one of (6) to (8), further including a droplet direction control unit that controls the traveling direction of the droplet, in which the device adjustment unit performs droplet stream calibration for calibrating control of the traveling direction of the droplet in the droplet direction control unit on the basis of the traveling direction of the droplet detected by the droplet detection unit.

(10)

The microparticle sorting device according to (9), in which the droplet direction control unit includes a charging unit that imparts a charge to the droplet and a deflection plate that changes the traveling direction of the droplet, and a charge voltage in the charging unit is calibrated in the droplet stream calibration.

(11)

The microparticle sorting device according to any one of (1) to (10), further including a storage that stores a result of the device adjustment in the device adjustment unit.

(12)

The microparticle sorting device according to any one of (1) to (11), further including an automatic or manual switching function associated with the device adjustment in the device adjustment unit.

(13)

The microparticle sorting device according to any one of (1) to (12), in which the microparticle includes a bioparticle.

(14)

A method for sorting microparticles including:

a process of causing microparticles to flow through a flow path;

a process of optically detecting the microparticles flowing through the flow path;

a process of forming a droplet containing the microparticles;

a process of sorting the microparticles; and a process of adjusting a device, in which in adjusting the device before sorting the microparticles, on the basis of information obtained from the microparticles to be sorted, the process of adjusting the device includes:

optical axis position calibration for calibrating a relative position of the flow path relative to irradiation light; and delay time calibration for calibrating a delay time from light detection from the microparticles to formation of the droplet.

REFERENCE SIGNS LIST

1 Microparticle sorting device
P Flow path
11 Light irradiation unit
12 Optical axis position display function
13 Light detection unit
14 Droplet forming unit
15 Droplet detection unit
16 Droplet information display function
17 Droplet direction control unit
18 Device adjustment unit
19 Storage
20 Automatic or manual switching function
21 Sorting unit

The invention claimed is:

1. A microparticle sorting device, comprising:
a light detection unit configured to optically detect a microparticle that flows through a flow path;
a droplet forming unit configured to form a droplet containing the microparticle;
a device adjustment unit configured to adjust the microparticle sorting device before actual measurement of the microparticle, wherein
based on information obtained from the microparticle to be measured, the device adjustment unit is configured to:
adjust an irradiation angle of irradiation light;
calibrate a relative position of a chip that includes the flow path relative to the irradiation light based on the adjustment of the irradiation angle of the irradiation light; and
calibrate a delay time from light irradiation to the microparticle to formation of the droplet; and a droplet detection unit configured to detect a state of the droplet, wherein the device adjustment unit is further configured to calibrate droplet formation in the droplet forming unit based on the state of the droplet.

2. The microparticle sorting device according to claim 1, further comprising an optical axis position display function configured to display the relative position of the flow path relative to the irradiation light.

3. The microparticle sorting device according to claim 1, wherein a frequency of a drive voltage supplied to a vibrating element is calibrated in the calibration of the droplet formation.

4. The microparticle sorting device according to claim 1, further comprising a droplet information display function configured to display information associated with the droplet detected by the droplet detection unit.

5. The microparticle sorting device according to claim 1, further comprising a droplet direction control unit configured to control a traveling direction of the droplet.

6. The microparticle sorting device according to claim 1, further comprising a storage configured to store a result of the device adjustment in the device adjustment unit.

7. The microparticle sorting device according to claim 1, further comprising an automatic or manual switching function associated with the device adjustment in the device adjustment unit.

8. The microparticle sorting device according to claim 1, wherein the microparticle includes a bioparticle.

9. The microparticle sorting device according to claim 1, wherein the state of the droplet includes a traveling direction of the droplet.

10. The microparticle sorting device according to claim 1, wherein the state of the droplet includes at least one state selected from a form of the droplet, a position of the droplet, a traveling direction of the droplet, and a width of a droplet stream.

11. The microparticle sorting device according to claim 10, further comprising a droplet direction control unit configured to control the traveling direction of the droplet, wherein
the device adjustment unit is further configured to calibrate control of the traveling direction of the droplet in the droplet direction control unit, and
the control of the traveling direction is calibrated based on the traveling direction of the droplet detected by the droplet detection unit.

12. The microparticle sorting device according to claim 11, wherein
the droplet direction control unit includes:
a charging unit configured to impart a charge to the droplet; and
a deflection plate configured to change the traveling direction of the droplet, and
a charge voltage in the charging unit is calibrated in the calibration of the control of the traveling direction.

13. A method for sorting microparticles, the method comprising:
causing microparticles to flow through a flow path;
optically detecting the microparticles flowing through the flow path;
forming a droplet containing the microparticles;
sorting the microparticles; and
adjusting a device before sorting the microparticles, wherein based on information obtained from the microparticles to be sorted, the adjusting of the device includes:
  adjusting an irradiation angle of irradiation light;
  calibrating a relative position of a chip that includes the flow path relative to the irradiation light based on the adjustment of the irradiation angle of the irradiation light; and
  calibrating a delay time from light detection from the microparticles to formation of the droplet;
detecting a state of the droplet; and
calibrating droplet formation based on the state of the droplet.

\* \* \* \* \*